United States Patent
Pesyna et al.

(10) Patent No.: US 10,544,755 B2
(45) Date of Patent: Jan. 28, 2020

(54) VARIABLE INFRARED SUPPRESSION SYSTEM IN A GAS TURBINE ENGINE

(71) Applicant: Rolls-Royce North American Technologies, Inc., Indianapolis, IN (US)

(72) Inventors: Kenneth M. Pesyna, Carmel, IN (US); Anthony F. Pierluissi, Fishers, IN (US)

(73) Assignee: ROLLS-ROYCE NORTH AMERICAN TECHNOLOGIES, INC., Indianapolis, IN (US)

( * ) Notice: Subject to any disclaimer, the term of this patent is extended or adjusted under 35 U.S.C. 154(b) by 428 days.

(21) Appl. No.: 15/270,903

(22) Filed: Sep. 20, 2016

(65) Prior Publication Data

US 2018/0080410 A1 Mar. 22, 2018

(51) Int. Cl.
*F02K 1/48* (2006.01)
*F02K 1/82* (2006.01)
*F02K 1/12* (2006.01)
*B64D 33/04* (2006.01)

(52) U.S. Cl.
CPC ............... *F02K 1/825* (2013.01); *F02K 1/12* (2013.01); *F02K 1/48* (2013.01); *B64D 2033/045* (2013.01)

(58) Field of Classification Search
CPC ... F02K 1/825; F02K 1/12; F02K 1/28; F02K 1/46; F02K 1/48; F02K 1/38; F02K 1/383; F02K 1/386; F02K 1/34; B64D 2033/045
See application file for complete search history.

(56) References Cited

U.S. PATENT DOCUMENTS

| | | | | |
|---|---|---|---|---|
| 3,409,228 A | * | 11/1968 | Mehr | F02K 1/123 239/127.3 |
| 3,641,766 A | * | 2/1972 | Uehling | F02C 3/06 239/265.17 |
| 3,710,890 A | * | 1/1973 | True | F02K 1/36 181/215 |
| 4,018,046 A | * | 4/1977 | Hurley | B64D 33/04 239/265.19 |
| 4,052,007 A | * | 10/1977 | Willard | F02K 1/006 239/265.29 |
| 4,052,847 A | * | 10/1977 | Rodgers | F02K 1/386 239/265.17 |
| 4,215,537 A | * | 8/1980 | Hurley | B64D 33/04 239/127.3 |
| 4,463,902 A | * | 8/1984 | Nightingale | F02K 1/11 239/265.17 |
| 4,502,637 A | * | 3/1985 | Nightingale | F02K 1/1292 239/265.17 |
| 4,537,026 A | * | 8/1985 | Nightingale | F02K 1/825 239/127.3 |
| 4,800,715 A | * | 1/1989 | Conway | F02K 1/825 60/264 |

(Continued)

*Primary Examiner* — William H Rodriguez
(74) *Attorney, Agent, or Firm* — McCracken & Gillen LLC

(57) ABSTRACT

According to one aspect, an infrared suppression system that utilizes a primary airflow and a secondary air flow for a gas turbine engine is provided. The infrared suppression system includes an exit flap configured to control a flow of exhaust air out of the gas turbine engine and a secondary flow door that is configured to selectively control the secondary air flow into the gas turbine engine. The mixture of the secondary air flow and the primary air flow from the gas turbine engine suppresses an infrared signature produced by the gas turbine engine.

20 Claims, 8 Drawing Sheets

(56) References Cited

U.S. PATENT DOCUMENTS

| | | | | |
|---|---|---|---|---|
| 4,848,664 A * | 7/1989 | Thayer | F02K 1/008 |
| | | | 239/265.29 |
| 4,864,819 A * | 9/1989 | Steyer | F01D 25/30 |
| | | | 60/264 |
| 5,154,052 A * | 10/1992 | Giffin, III | F02K 1/006 |
| | | | 239/265.13 |
| 5,216,878 A * | 6/1993 | Klees | F02C 7/042 |
| | | | 60/204 |
| 5,222,359 A * | 6/1993 | Klees | F02C 7/04 |
| | | | 60/204 |
| 5,261,229 A * | 11/1993 | Ford | F02K 1/386 |
| | | | 60/262 |
| 5,291,672 A * | 3/1994 | Brown | F02K 1/827 |
| | | | 181/213 |
| 5,313,789 A * | 5/1994 | Loving | F02K 9/78 |
| | | | 60/246 |
| 5,435,127 A * | 7/1995 | Luffy | F02K 1/1223 |
| | | | 60/204 |
| 5,463,866 A * | 11/1995 | Klees | F02K 1/383 |
| | | | 239/265.17 |
| 5,801,341 A * | 9/1998 | Newell | B64D 33/06 |
| | | | 181/215 |
| 5,821,472 A * | 10/1998 | Zwernemann | B64D 33/06 |
| | | | 181/215 |
| 5,826,794 A * | 10/1998 | Rudolph | F02K 1/383 |
| | | | 239/265.17 |
| 5,884,843 A * | 3/1999 | Lidstone | F02K 1/34 |
| | | | 181/220 |
| 5,908,159 A * | 6/1999 | Rudolph | F02K 1/383 |
| | | | 239/265.17 |
| 6,662,548 B1 * | 12/2003 | Clark | F02K 1/386 |
| | | | 60/204 |
| 7,614,210 B2 * | 11/2009 | Powell | F02K 1/08 |
| | | | 60/226.1 |
| 7,810,335 B2 * | 10/2010 | Dussillols | F02K 1/36 |
| | | | 181/213 |
| 2005/0217239 A1 * | 10/2005 | Wollenweber | B64D 33/04 |
| | | | 60/262 |
| 2005/0268595 A1 * | 12/2005 | Steyer | B64D 33/04 |
| | | | 60/204 |
| 2006/0226282 A1 * | 10/2006 | Beutin | F01D 5/148 |
| | | | 244/23 D |
| 2006/0230744 A1 * | 10/2006 | Beutin | F02K 1/006 |
| | | | 60/231 |
| 2013/0343866 A1 * | 12/2013 | Christians | F01D 17/141 |
| | | | 415/1 |
| 2015/0211441 A1 * | 7/2015 | Moon | F02K 1/386 |
| | | | 60/262 |
| 2016/0208715 A1 * | 7/2016 | Ruberte Sanchez | F02K 1/386 |

* cited by examiner

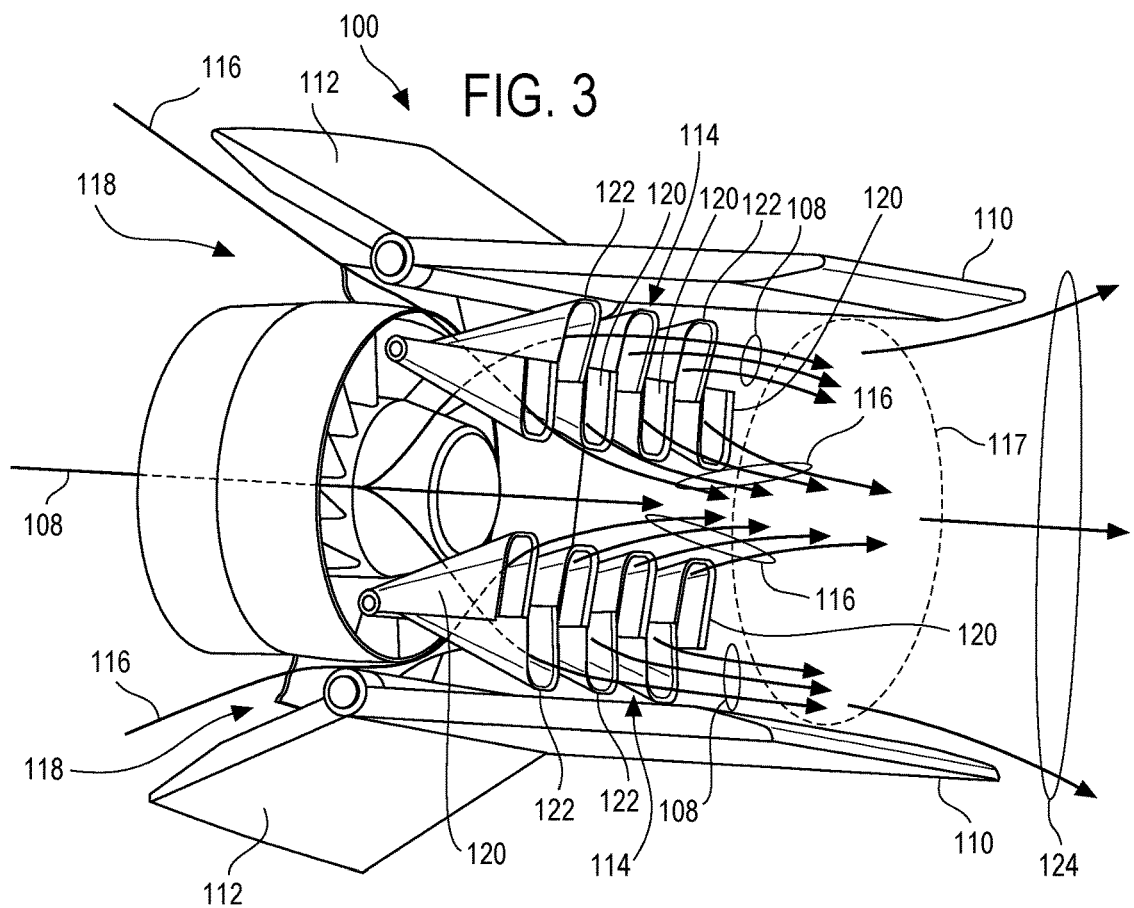
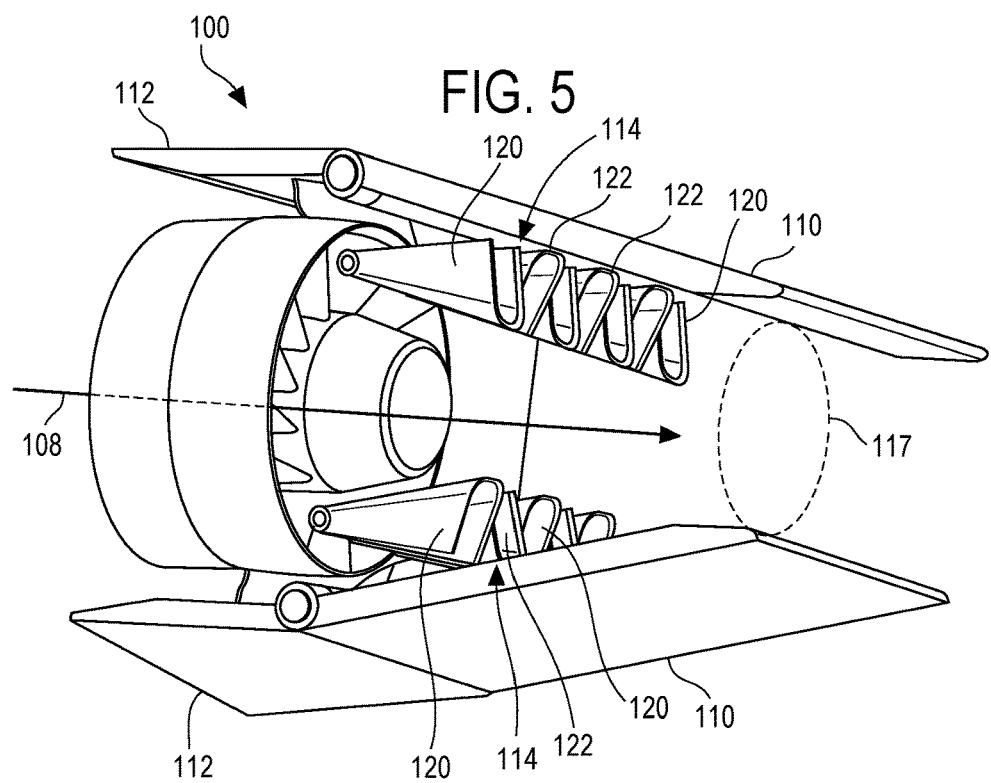

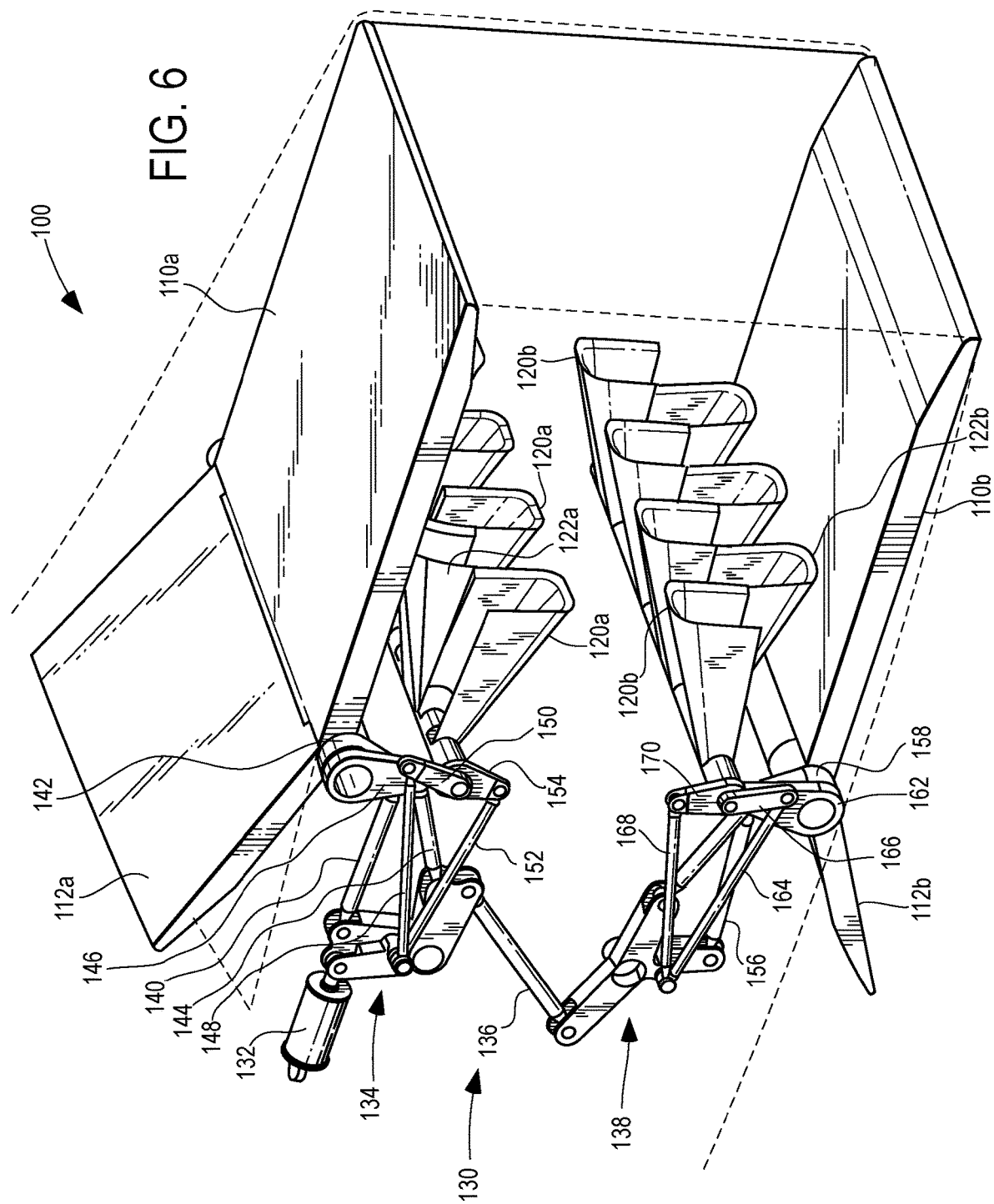

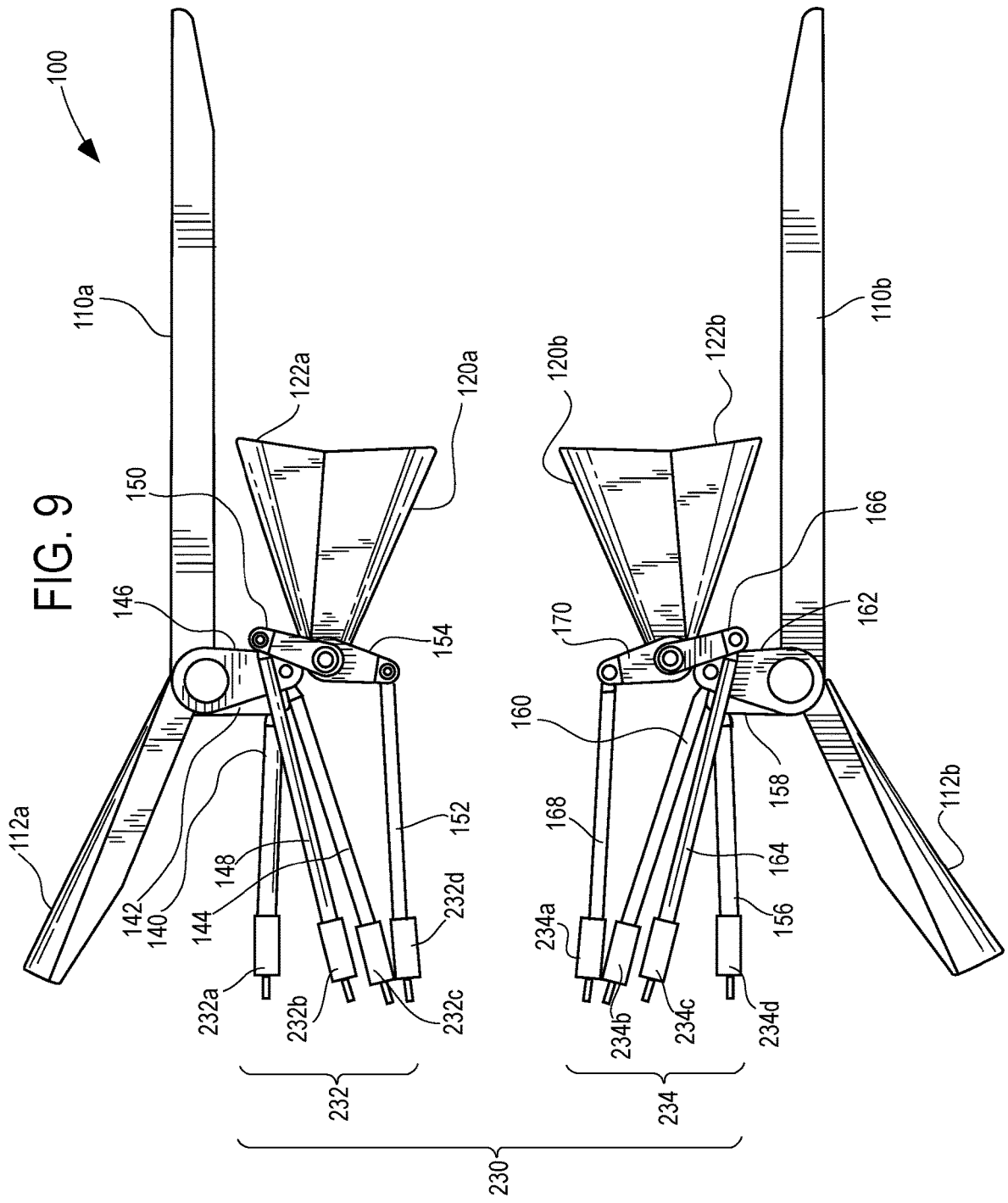

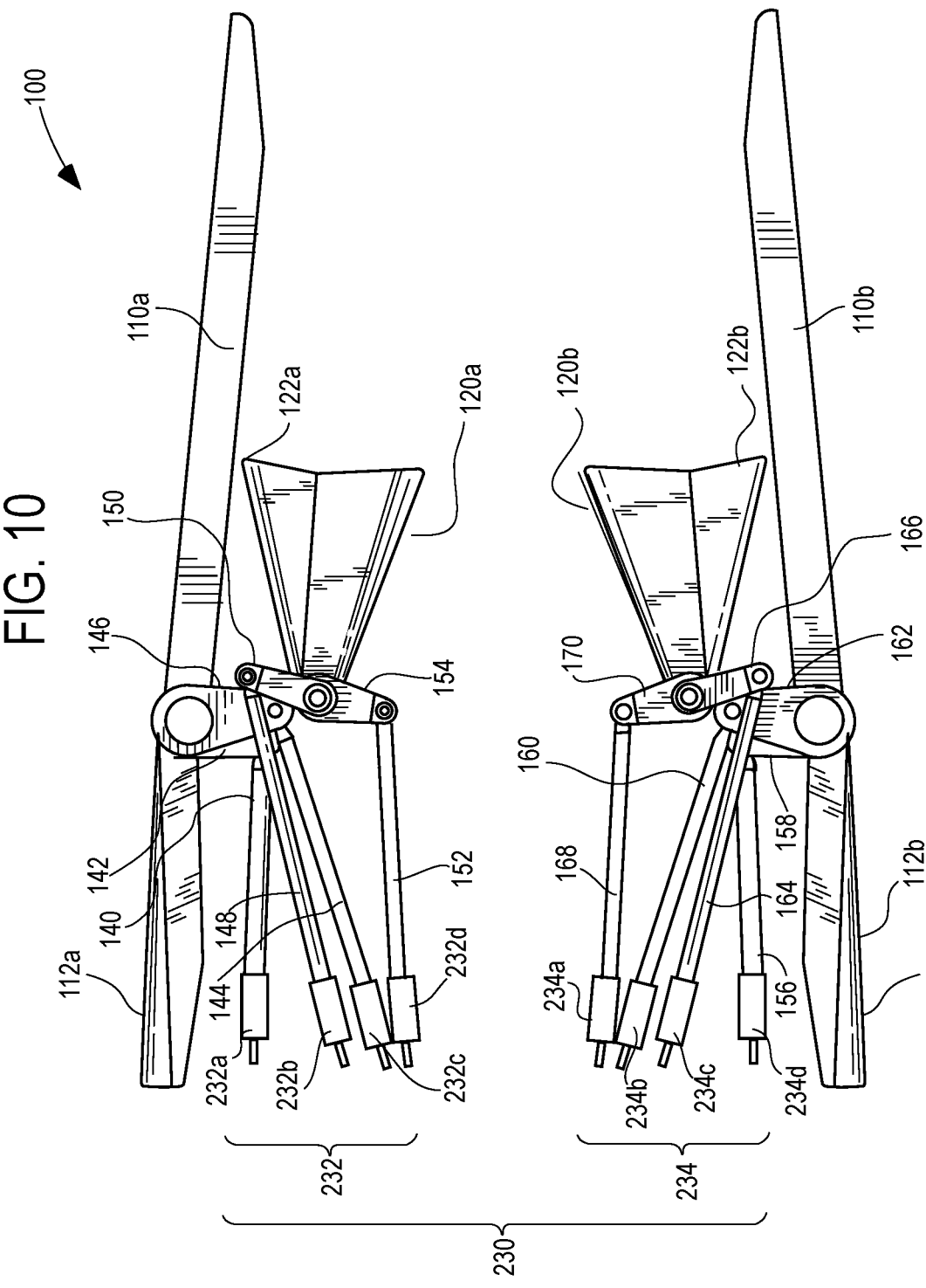

VARIABLE INFRARED SUPPRESSION SYSTEM IN A GAS TURBINE ENGINE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to gas turbine engines, and more particularly, to infrared suppression systems for gas turbine engines.

BACKGROUND

Gas turbine engines comprise a number of components that are assembled in series and axially in relation to one another. One of the components in this assembly is an exhaust portion that directs a hot exhaust fluid out of the gas turbine engine. In the instances where the gas turbine engine is utilized in an aircraft, and more specifically a military aircraft, the hot exhaust fluid exiting through the exhaust portion and a nozzle portion as well as the heated solid structures of the exhaust and nozzle portions produce an infrared (IR) signature. The hot exhaust fluid generated by a combustion in the gas turbine engine has a temperature in the range of about 600 to about 1100 Fahrenheit. The infrared (IR) signature can be detected by hostile heat-seeking missiles and can significantly elevate a threat level to safe operation of the aircraft. Traditionally, various techniques such as decoy flares have been used to thwart the infrared heat-seeking missiles from locking onto the IR signature of the aircraft. The decoy flares technique, however, requires continual use of flares and can be inefficient and in some instances ineffective. Thus, there is a need for another IR signature suppression system to more efficiently and effectively blunt an IR signature detection system of a heat-seeking missile in threat situations against an aircraft.

SUMMARY

According to one aspect, an infrared suppression system is described that utilizes a primary airflow and a secondary air flow for a gas turbine engine. The infrared suppression system comprises an exit flap configured to control a flow of exhaust air out of the gas turbine engine. A secondary flow door is configured to selectively control the secondary air flow into the gas turbine engine, wherein a mixture of the secondary air flow and the primary air flow from the gas turbine engine suppresses an infrared signature produced by the gas turbine engine.

According to another aspect, a gas turbine engine is described having an infrared suppression system. A secondary flow door configured to control a secondary air flow into the gas turbine engine and an exit flap configured to control a flow of exhaust air out of the gas turbine engine are provided. A level of mixture of the secondary air flow and a primary air flow causes changes in modes between an infrared suppression mode and a performance mode of the gas turbine engine.

Other aspects and advantages will become apparent upon consideration of the following detailed description and the attached drawings wherein like numerals designate like structures throughout the specification.

BRIEF DESCRIPTION OF THE DRAWINGS

FIG. 3 is an enlarged, fragmentary, elevational, isometric view of the embodiment of the infrared suppression system for the gas turbine engine of FIG. 1;

FIG. 5 is an enlarged, fragmentary, elevational, isometric view of the embodiment of the gas turbine engine of FIG. 2 in the performance mode;

FIG. 6 is an enlarged, fragmentary, isometric view of the embodiment of the infrared suppression system for the gas turbine engine of FIG. 1 utilizing an actuator with a single degree-of-freedom mode of operation;

FIG. 9 is an enlarged, fragmentary, elevational view of the embodiment of the gas turbine engine of FIG. 1 in the IR suppression mode utilizing an actuator with a multiple degree-of-freedom mode of operation; and FIG. 10 is an enlarged, fragmentary, elevational view of the embodiment of the gas turbine engine of FIG. 1 in an intermediate mode utilizing the actuator with a multiple degree-of-freedom mode of operation.

DETAILED DESCRIPTION

As shown herein an infrared suppression system is provided that utilizes a primary air flow and a secondary air flow in a gas turbine engine and manipulates a mixture of the primary and secondary air flows to suppress an IR signature of a plume of hot exhaust air or fluid as well as heated solid structures associated with an exhaust and nozzle portion of the gas turbine engine. The IR suppression system may be part of an exhaust portion of the gas turbine engine. The secondary air flow may be introduced into the gas turbine engine from the outside environment external to gas turbine engine. When the IR suppression system is activated and it operates in an IR suppression mode, the mixture of the secondary air flow with the primary air flow is maximized. When the IR suppression system is deactivated, secondary air flow is blocked and the gas turbine engine operates in a performance mode. In the performance mode, the fuel efficiency and an amount of thrust available to the gas turbine engine is optimized. The gas turbine engine may also operate in an intermediate mode between an IR suppression mode and the performance mode. In the intermediate mode, the amount of secondary air flow mixed with the primary air flow is reduced and is less than the amount during the IR suppression mode of operation.

Figure 1:
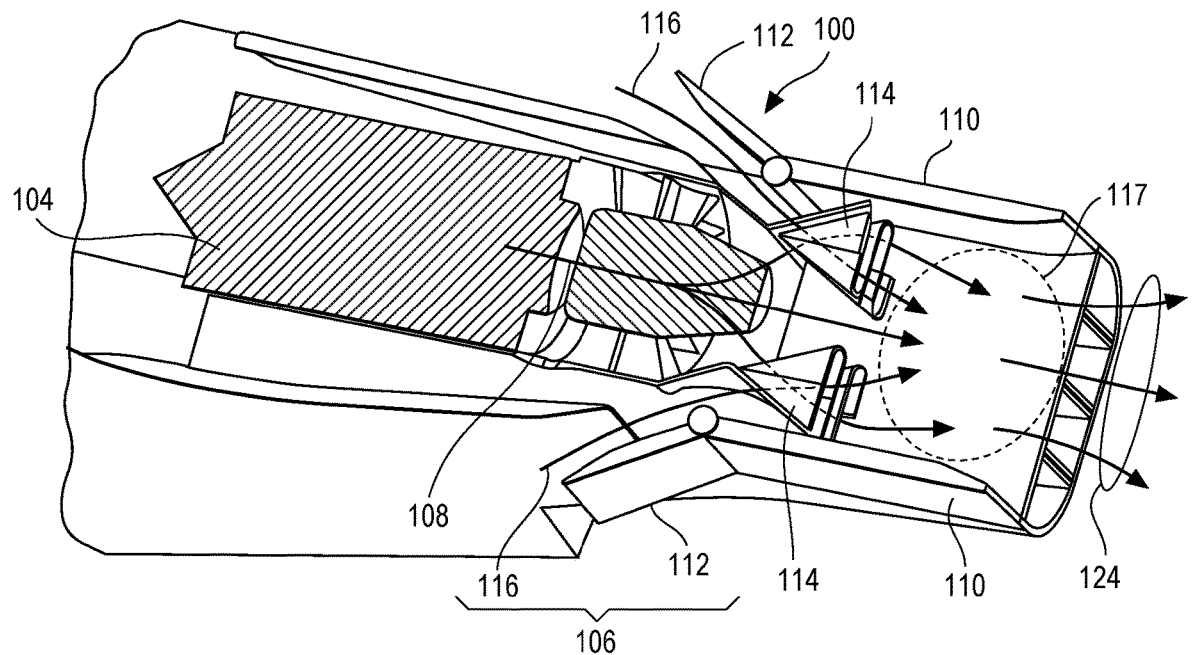
FIG. 1 is a fragmentary, cross sectional, elevational, isometric view of an embodiment of an infrared suppression system for a gas turbine engine in an activated IR suppression mode.

FIG. 1 illustrates a fragmentary, cross sectional, elevational, isometric view of an embodiment of an IR suppression system 100 for a gas turbine engine 102 in an activated or IR suppression mode. Hot air or fluid is pressurized in the combustor portion (not shown) of the gas turbine engine 102 and is forced outwardly through a turbine portion 104 and is passed through an exhaust portion 106. The hot air flow hereinafter referred to as primary air flow (as indicated by arrow 108) produces a thrust for the gas turbine engine 102 and an associated aircraft (not shown). This example embodiment of the IR suppression system 100 may include one or more exit flaps 110, one or more secondary flow doors 112, and a mixer element 114. When the IR suppression system 100 is activated and is in the IR suppression mode, the secondary flow door 112 is opened and a secondary air flow (as indicated by arrow 116) is introduced into the exhaust portion 106 of the gas turbine engine 102. The secondary air flow 116 may be at ambient temperature, or cooled, or at least at a substantially lower temperature than the temperature of the primary air flow 108.

The introduction of the secondary air flow 116 at the location of the exhaust portion 106 results in a desired mixing of the primary air flow 108 with the secondary air flow 116 inside a plenum 117 (shown as dotted lines). This mixing of the primary and secondary air flows, 108, 116 substantially lowers the temperature of the primary air flow 108. A more thorough mixing of the primary and the secondary air flows 108, 116 may be achieved by utilizing the mixer element 114 to further intermix streams of secondary air flow 116 with other streams of primary air flow 108 as described below. Exit flaps 110 are opened or expanded to allow for an expansion of a volume of a cooled exhaust fluid 124 which is the mixture of the primary and secondary air flows 108, 116. The opening of the exit flaps 110 provides for a wider discharge area and dissipation of the cooled exhaust fluid 124 which further contributes to a rapid reduction of the temperature of the cooled exhaust fluid 124 such that the IR signature is substantially minimized or eliminated. It should be noted that the mixing of the primary and secondary air flows, 108, 116 substantially lowers the temperature of the solid structures of the one or more exit flaps 110, one or more secondary flow doors 112, and the mixer element 114 which further contributes to the minimization or elimination of the IR signature. A cooler mixed primary and secondary air flows 108, 116 wash over and lay a cool air film over the exit flaps 110, secondary flow doors 112, and the mixer element 114.

Figure 2:
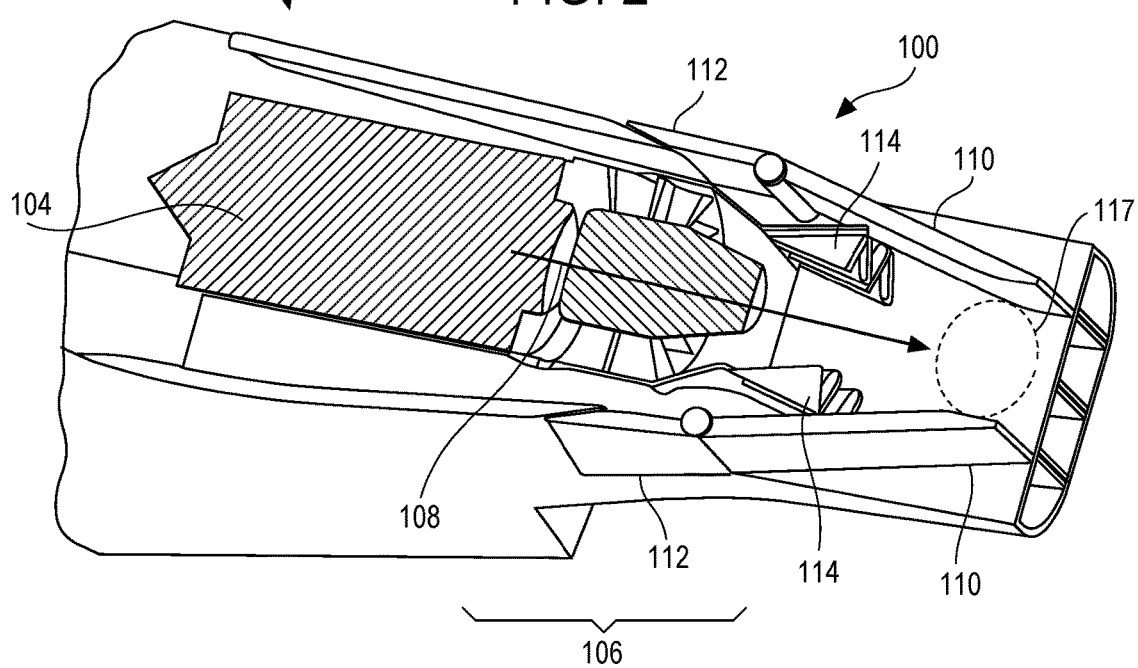
FIG. 2 is a fragmentary, cross sectional, elevational, isometric view of the embodiment of the gas turbine engine of FIG. 1 in a performance mode.

Referring to FIG. 2, the IR suppression system 100 is shown in a deactivated mode where the gas turbine engine 102 is in a performance mode. While in the performance mode, the secondary flow doors 112 are closed and a minimal amount (if any) of secondary air flow 116 is introduced into the exhaust portion 106 of the gas turbine engine 102 and consequently the primary air flow 108 is not mixed with secondary air flow 116. Therefore, the temperature of the primary air flow 108 is not reduced and the hot exhaust air or fluid is discharged from the gas turbine engine 102. In addition to the closure of the secondary flow doors 112, the exit flaps 110 are also collapsed or closed, therefore, providing a narrow flow path for the discharge of the primary air flow 108 and as a result increasing the discharge pressure of the hot exhaust fluid. The increased discharge pressure substantially contributes to an improved level of thrust for the gas turbine engine 102 and the associated aircraft. It should be noted that the mixer element 114 may also be deployed into a collapsed configuration to further streamline the primary air flow 108 through the narrow flow path.

Referring to FIG. 3, the mixer element 114 is shown in an expanded configuration. In the activated IR suppression mode, the secondary air flow 116 is supplied through one or more openings 118, created by the secondary flow doors 112, and is directed into an expanded mixer element 114. The mixer element 114 is configured to variably expand and collapse in order to variably mix the primary air flow 108 with the secondary air flow 116. The mixer element 114 in this example includes a primary air flow element and a secondary air flow element. The primary air flow element may be, for example, lobe-shaped and arranged as a series of primary air lobes 122 and similarly, the secondary air flow element may also be lobe-shaped and arranged as a series of secondary air lobes 120. As shown in FIG. 3, the series of secondary air lobes 120 direct the secondary air flow 116 into a path of the primary air flow 108. Furthermore, the series of primary air lobes 122 interposed in between each of the secondary air lobes 120 cause a portion of the primary air flow 108 to expand radially and consequently provide for even a more effective mixing of the primary and secondary air flows 108, 116. The exit flaps 110 are in an open or expanded configuration contributing to a wider flow path for the mixture of the primary and secondary air flows, thus, forming the cooled exhaust fluid 124 without the IR signature.

Figure 4:
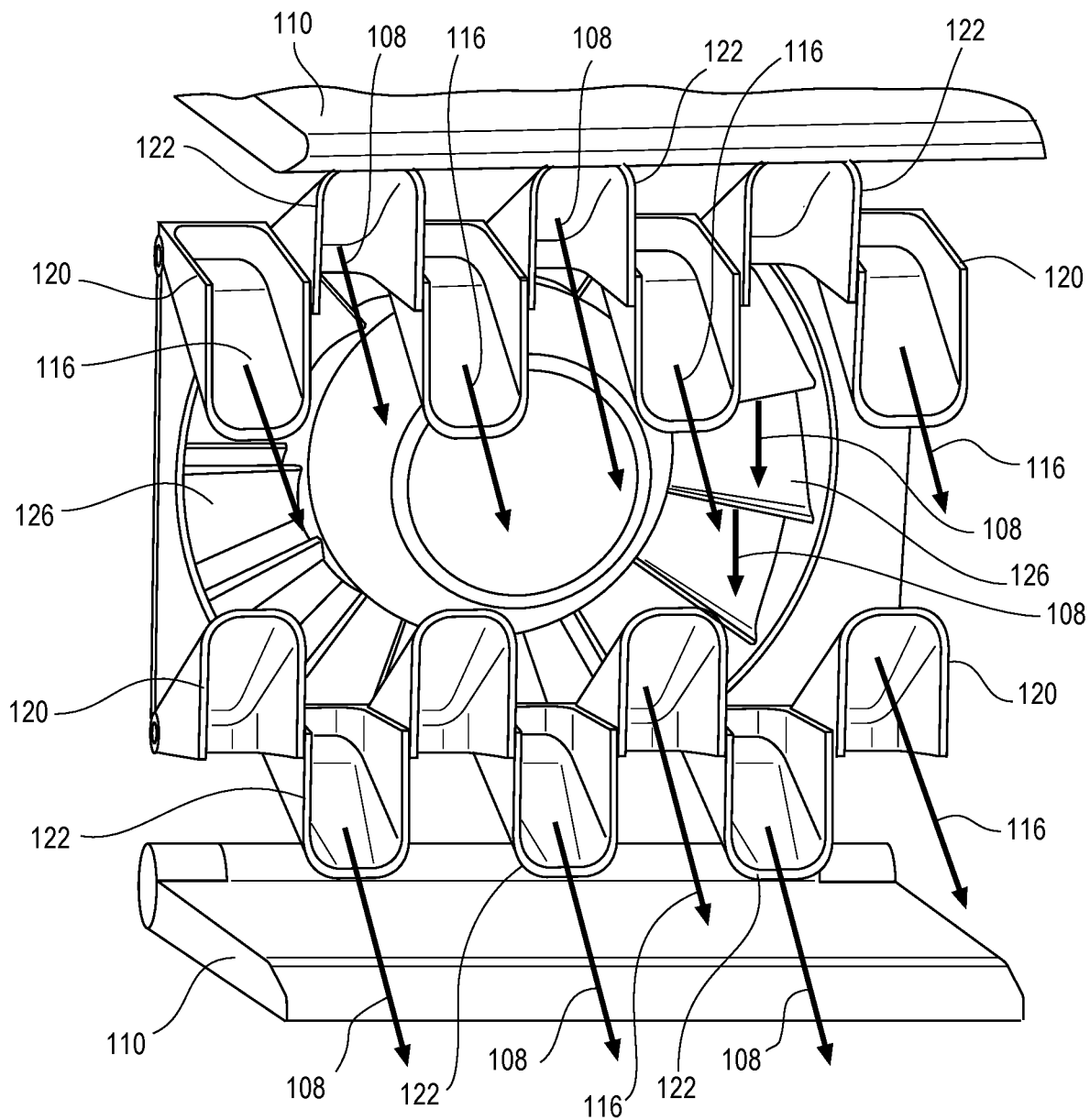
FIG. 4 is an enlarged, fragmentary, isometric, aft-looking forward view of the embodiment of the infrared suppression system for the gas turbine engine of FIG. 1.

Referring to FIG. 4, an example of the mixer element 114 and the components thereof such as the series of primary air lobes 122 and the series of secondary air lobes 120 are shown in more detail in an enlarged, fragmentary, isometric, aft-looking forward view for the IR suppression system 100 in the activated IR suppression mode. The primary air flow 108 may pass through two paths. The first path is through a set of vane packs 126, which are part of the exhaust portion 106, and into the plenum 117. It is to be noted that other configurations in place of the vane packs 126 may be utilized for the passage of the primary air flow 108 from the turbine portion 104. The second path for the portion of the primary air flow 108 may be through the series of primary air lobes 122. The secondary air flow 116 is directed through the series of secondary air lobes 120 and into the plenum 117 where the primary air flow 108 is mixed with the secondary air flow 116. (See FIG. 3)

Referring to FIG. 5, the IR suppression system 100 is shown in a deactivated mode. As noted above, when the IR suppression system 100 is deactivated, then the gas turbine engine 102 operates in the performance mode. In the performance mode, each of the secondary flow door 112, the exit flap 110, and the mixer element 114 is in a closed position. As shown in an enlarged view, the mixer element 114 is closed by being deployed in a collapsed configuration. The closed secondary flow doors 112 prevent the introduction of secondary air flow 116. Moreover, the closed exit flaps 110 reduce an available volume of the plenum 117 and provide a narrower flow path for the primary air flow 108. Therefore, in the gas turbine engine performance mode, hot primary air flow 108 is forced through a smaller plenum volume and a narrower flow path which results in a more forceful discharge of the hot exhaust fluid. This can provide more fuel efficiency and an improvement in thrust for the gas turbine engine 102. Furthermore, control of the exit flaps 110 provides for optimization of the volume of the plenum 117 to achieve an optimum balance between engine back pressure and exit thrust.

Referring to FIG. 6, a first actuation mechanism 130 that performs in a single degree-of-freedom mode operates the gas turbine engine 102 either in the IR suppression mode or the performance mode. As shown in more detail in FIG. 6, a secondary air flow element in the form of the mixer element 114 comprises upper secondary air lobes 120a and lower secondary air lobes 120b, the secondary flow doors 112 comprise upper and lower secondary airflow doors 112a and 112b respectively, and the exit flaps 110 comprise upper and lower exit flaps 110a and 110b respectively (all of which are hereinafter collectively referred to as components). It should be noted that in the single degree-of-freedom mode, positions of each of upper and lower secondary air flow doors 112a, 112b, secondary air flow element and upper and lower exit flaps 110a, 110b should be only one of the open and closed positions (although it is possible that these components may be configured to move to an in-between the open and closed positions). When each of the aforementioned components is positioned in only the open position, then the IR suppression system 100 would operate in the IR suppression mode. Conversely, when each of the components is in the closed position, then the gas turbine engine 102 would operate in the performance mode. As seen in FIG. 6, a first actuator 132 supplies a reciprocating movement to an upper bell crank 134. The upper bellcrank 134 is interlinked via a lower bellcrank drive link 136 to a lower bellcrank 138. As a result, the reciprocating movement of the first actuator 132 is also transferred to the lower bellcrank 138. An upper secondary airflow door (USAD) connector link 140 is connected between the upper bellcrank 134 and an USAD pivot arm 142 (See FIG. 7). Similarly, an upper exit flap (UEF) connector link 144 is connected between the upper bellcrank 134 and an UEF pivot arm 146. An upper primary air lobes (UPAL) connector link 148 is connected between the upper bellcrank 134 and upper primary air lobes pivot arm 150. An upper secondary air lobes (USAL) connector link 152 is connected between the upper bellcrank 134 and USAL pivot arm 154. The reciprocating movement of the first actuator 132 results in the opening and closing of the USAD 112a, the UEF 110a, and the USAL 120a. As described above, the lower bellcrank drive link 136 transfers the reciprocating movement of the first actuator 132 to a lower and opposite portion of the first actuation mechanism 130 through the lower bellcrank 138.

Figure 7:
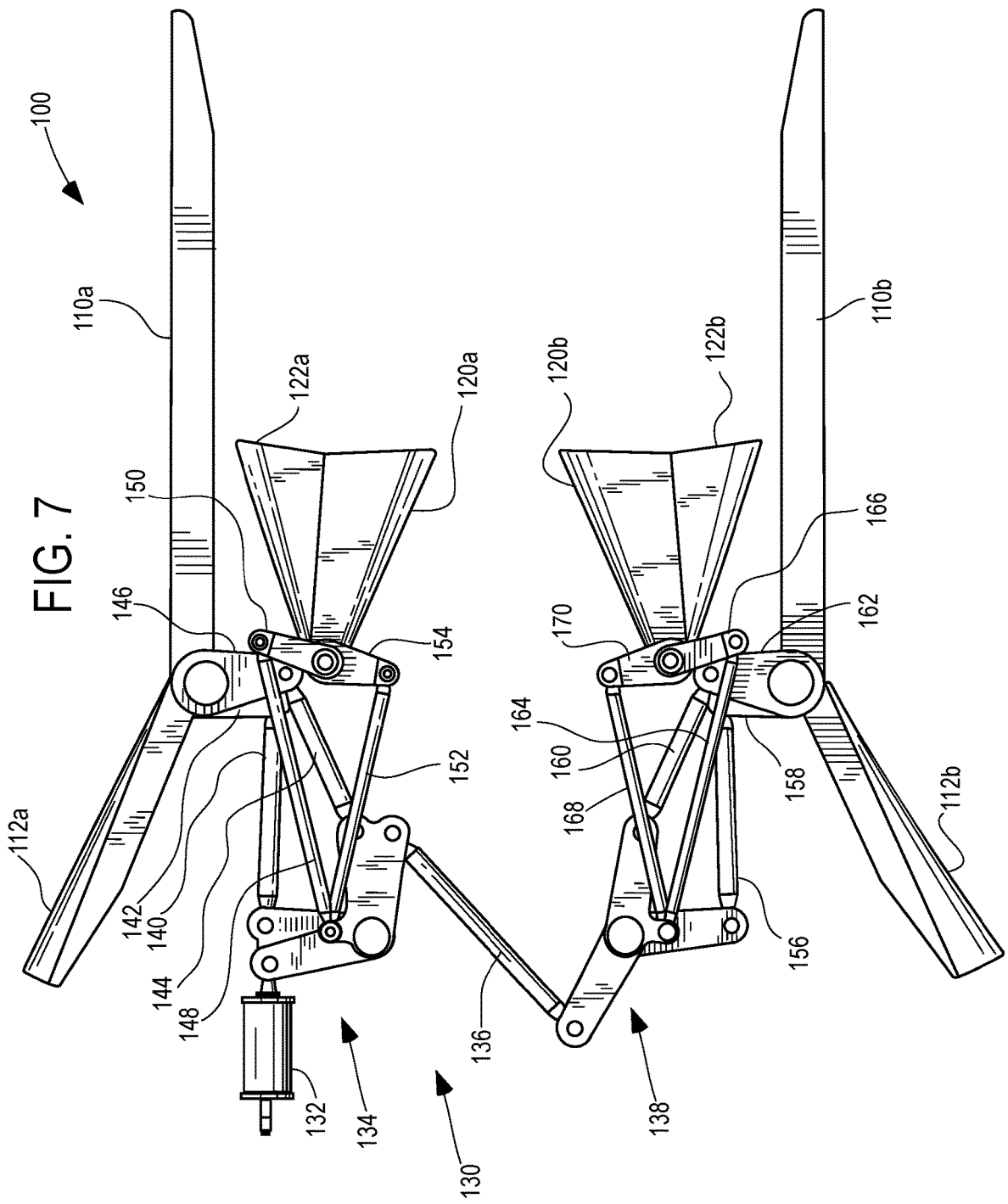
FIG. 7 is an enlarged, fragmentary, elevational view of the embodiment of the infrared suppression system for the gas turbine engine of FIG. 6.
Figure 8:
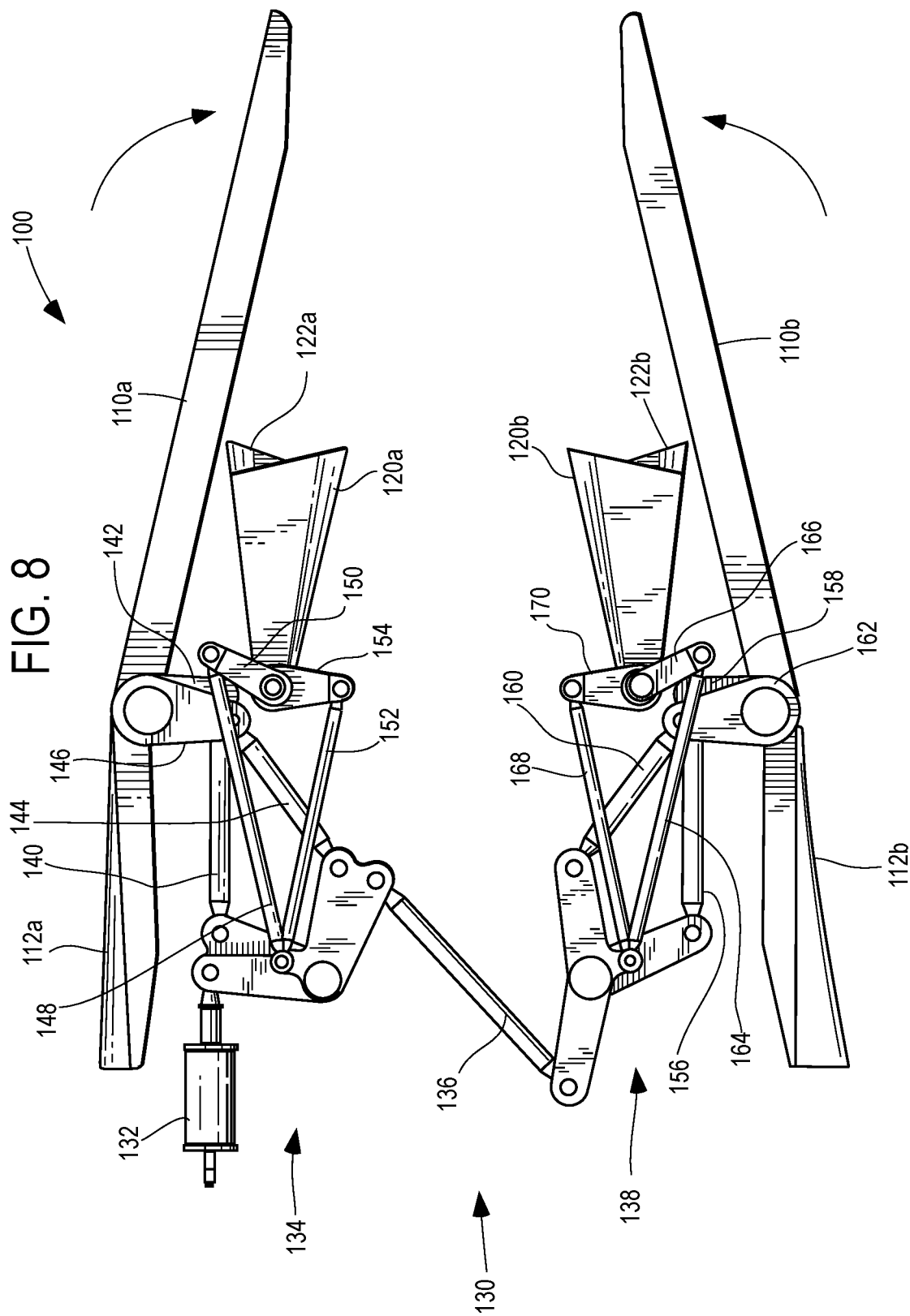
FIG. 8 is an enlarged, fragmentary, elevational view of the embodiment of the gas turbine engine of FIG. 2 in the performance mode utilizing the actuator with a single degree-of-freedom mode of operation.

Referring to FIG. 7, a lower secondary airflow door (LSAD) connector link 156 is connected between the lower bellcrank 138 and a LSAD pivot arm 158. Similarly, a lower exit flap (LEF) connector link 160 is connected between the lower bellcrank 138 and a LEF pivot arm 162. A lower primary air lobes (LPAL) connector link 164 is connected between the lower bellcrank 138 and lower primary air lobes pivot arm 166. A lower secondary air lobes (LSAL) connector link 168 is connected between the lower bellcrank 138 and LSAL pivot arm 170. The reciprocating movement of the first actuator 132 results in the opening and closing of the LSAD 112b, the LEF 110b, the LSAL 120b coordinated and together with the opening and closing of the USAD 112a, the UEF 110a, and the USAL 120a, as described above. FIG. 8 shows the IR suppression system 100 of the gas turbine engine 102 in the performance mode. Here, the first actuation mechanism 130 via the movement of the first actuator 132 configures all of the components to the closed position which is the opposite position of the IR suppression mode.

The gas turbine engine 102 may be operated in an intermediate mode, which is a mode in-between the IR suppression mode and the performance mode. In the intermediate mode, at least one of the components should be in a substantially closed position. The IR suppression system 100 of the gas turbine engine 102 may include an actuator mechanism that configures the positions of the secondary air flow door 112, the secondary air flow element and the exit flap 110 such that the IR suppression system 100 is operated in the intermediate mode. The actuator may operate in multiple degrees-of-freedom mode to variably operate the secondary air flow door 112, the secondary air flow element and the exit flap 110 between a range of a substantially open position and a substantially closed position. Referring to FIG. 9, an example of a second actuation mechanism 230 is shown that is capable of performing in multiple degrees-of-freedom mode and can operate the gas turbine engine 102 in any one of the IR suppression mode, the performance mode, and the intermediate mode in-between the IR suppression mode and the performance mode. It should be noted that the configuration depicted in FIG. 9 is an example of an IR suppression mode achieved utilizing the second actuation mechanism 230. The second actuation mechanism 230 includes a set of upper actuators 232 and a set of lower actuators 234. The upper actuators 232 may comprise a group of upper independently dedicated (UID) actuators 232a, 232b, 232c, and 232d that separately control the movement of the USAD 112a, USAL 120a, upper primary air lobe 122a, and UEF 110a. Likewise, the lower actuators 234 may comprise lower independently dedicated (LID) actuators 234a, 234b, 234c, and 234d that separately control the movement of the LSAD 112b, LSAL 120b, lower primary air lobe 122b, and LEF 110b.

Referring to FIG. 10, the IR suppression system 100 of the gas turbine engine 102 is shown in an example of the intermediate mode utilizing the second actuation mechanism 230. As seen, the USAD 112a and the LSAD 112b are in substantially closed positions while the UEF 110a and the LEF 110b are in substantially open positions. It should be noted that one of ordinary skill in the art may modify the structural design of the actuation mechanism 230 through adding an additional pivot and linkage in-between the upper actuators 232 and the lower actuators 234 and thereby reduce the number of the upper and lower actuators by half. In this manner, each of the corresponding upper and lower components can be operated together by a single corresponding independently dedicated actuator.

The design options for IR suppression system 100 as described herein is not limited to any specific application and may be used, for example, with commercial aircrafts, naval vessels or other applications.

INDUSTRIAL APPLICABILITY

As provided herein, the IR suppression system may be employed in connection with a gas turbine engine, and more specifically, for example, a gas turbine engine intended to be used in a military aircraft. The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. An infrared suppression system that utilizes a primary airflow and a secondary air flow for a gas turbine engine, comprising:
   an exit flap configured to control a flow of exhaust air out of the gas turbine engine;
   a secondary flow door configured to selectively control the secondary air flow from outside of the gas turbine engine into the gas turbine engine; and
   a variable mixer element comprising primary lobes and secondary lobes rotatably mounted on a transverse shaft, wherein the secondary air flow from outside of the gas turbine engine is at a substantially lower temperature than a temperature of the primary air flow inside the gas turbine engine, and wherein a mixture of the secondary air flow and the primary air flow from the gas turbine engine suppresses an infrared signature produced by the gas turbine engine.

2. The infrared suppression system of claim 1, wherein the variable mixer element is configured to variably mix the primary air flow with the secondary air flow.

3. The infrared suppression system of claim 2, wherein an actuator is configured to open and close the primary lobes and secondary lobes of the variable mixer element.

4. The infrared suppression system of claim 3, wherein the secondary flow door in a substantially closed position reduces the secondary air flow therethrough and minimizes a mixing of the primary air flow and the secondary air flow.

5. The infrared suppression system of claim 4, wherein in an intermediate mode at least one of the secondary flow door, the variable mixer element and the exit flap is in a substantially closed position.

6. The infrared suppression system of claim 3, wherein the secondary flow door in an open position directs the secondary air flow into the primary air flow such that the primary flow and the secondary air flow mix.

7. The infrared suppression system of claim 6, wherein in an infrared suppression mode each of the secondary flow door, the variable mixer element and the exit flap are in open positions.

8. The infrared suppression system of claim 3, wherein the actuator is coupled to the secondary air flow door, the variable mixer element, and the exit flap, wherein the actuator operates in a single degree-of-freedom mode by positioning each of the secondary air flow door, the variable mixer element, and the exit flap in only one of an open position and a closed position.

9. The infrared suppression system of claim 8, wherein the actuator operates in a multiple degrees-of-freedom mode by variably operating the secondary air flow door, the variable mixer element and the exit flap between a substantially open position and a substantially closed position.

10. A gas turbine engine having an infrared suppression system, comprising:
    a secondary flow door configured to control a secondary air flow into an exhaust portion of the gas turbine engine;
    an exit flap configured to control a flow of exhaust air out of the gas turbine engine, wherein a level of mixture of a primary air flow inside the gas turbine engine and the secondary air flow from outside of the gas turbine engine causes changes in modes between an infrared suppression mode and a performance mode of the gas turbine engine; and
    a variable mixer element comprising a set of primary lobes and a set of secondary lobes coupled to an actuator, the actuator configured to position the variable mixer element in a collapsed position in the performance mode, and wherein the secondary air flow from outside of the gas turbine engine is at a substantially lower temperature than a temperature of the primary air flow inside the gas turbine engine.

11. The gas turbine engine of claim 10, wherein the variable mixer element is configured to variably mix the primary air flow with the secondary air flow in an expanded position in the infrared suppression mode.

12. The gas turbine engine of claim 11, wherein the set of primary lobes and the set of secondary lobes respectively direct the primary air flow and the secondary air flow.

13. A gas turbine engine having an infrared suppression system, comprising:
    a secondary flow door configured to control a secondary air flow into the gas turbine engine;
    an exit flap configured to control a flow of exhaust air out of the gas turbine engine, wherein a level of mixture of the secondary air flow and a primary air flow causes changes in modes between an infrared suppression mode and a performance mode of the gas turbine engine; and
    a variable mixer element configured to variably mix the primary air flow with the secondary air flow, wherein the variable mixer element comprises a primary air flow element and a secondary air flow element, wherein in the infrared suppression mode an actuator is configured to position the secondary flow door, the secondary air flow element and the exit flap in open positions.

14. The gas turbine engine of claim 13, wherein in the performance mode the actuator is configured to position the secondary flow door, the secondary air flow element and the exit flap in closed positions.

15. The gas turbine engine of claim 14, wherein in an intermediate mode between the infrared suppression mode and the performance mode at least one of the secondary flow door, the secondary air flow element and the exit flap is in a substantially closed position.

16. The gas turbine engine of claim 15, wherein the actuator is coupled to the secondary air flow door, the secondary air flow element and the exit flap, wherein the actuator operates in multiple degrees-of-freedom mode by variably operating the secondary air flow door, the secondary air flow element, and the exit flap between a substantially open position and the substantially closed position.

17. The gas turbine engine of claim 14, wherein the actuator operates in a single degree-of-freedom mode by positioning each of the secondary air flow door, the secondary air flow element, and the exit flap in only one of open positions or closed positions.

18. The infrared suppression system of claim 1, comprising a further variable mixer element mounted opposite the variable mixer element.

19. The gas turbine engine of claim 10, comprising a further variable mixer element, wherein the variable mixer element is an upper mixer and the further variable mixer element is a lower mixer, wherein the upper mixer comprises an upper linkage and the lower mixer comprises a lower linkage, and wherein the upper linkage the lower linkage are coupled to the actuator.

20. The gas turbine engine of claim 12, wherein the set of primary lobes and the set of secondary lobes are mounted in an alternating arrangement.

* * * * *

UNITED STATES PATENT AND TRADEMARK OFFICE
CERTIFICATE OF CORRECTION

PATENT NO. : 10,544,755 B2
APPLICATION NO. : 15/270903
DATED : January 28, 2020
INVENTOR(S) : Kenneth M. Pesyna and Anthony F. Pierliissi It is certified that error appears in the above-identified patent and that said Letters Patent is hereby corrected as shown below:

Column 7
Line 46, Claim 5, please delete "element" and insert --element,--.

Column 7
Line 54, Claim 7, please delete "element" and insert --element,--.

Column 8
Line 46, Claim 13, please delete "element" and insert --element,--.

Column 8
Line 49, Claim 14, please delete "element" and insert --element,--.

Column 8
Line 54, Claim 15, please delete "element" and insert --element,--.

Signed and Sealed this
Third Day of March, 2020

Andrei Iancu
*Director of the United States Patent and Trademark Office*